United States Patent [19]

Julian

[11] Patent Number: 4,941,815
[45] Date of Patent: Jul. 17, 1990

[54] INJECTION-BLOW MOLDING APPARATUS

[75] Inventor: Randall K. Julian, Evansville, Ind.

[73] Assignee: Sunbeam Plastics Corporation, Evansville, Ind.

[21] Appl. No.: 299,969

[22] Filed: Jan. 19, 1989

[51] Int. Cl.⁵ .............................................. B29C 49/06
[52] U.S. Cl. .................................. 425/525; 215/1 C; 222/571; 264/537; 425/533
[58] Field of Search ....................... 425/525, 533, 537; 264/533, 537; 222/571; 215/1 C; 428/34.1, 35.7, 36.9

[56] References Cited

U.S. PATENT DOCUMENTS

| Re. 26,265 | 9/1967 | Farkas | 425/167 |
|---|---|---|---|
| 2,778,533 | 1/1957 | Savary | 425/525 X |
| 3,183,552 | 5/1965 | Farkas | 425/535 X |
| 3,297,213 | 1/1967 | Henderson | 222/542 |
| 3,597,793 | 8/1971 | Weiler et al. | 425/525 X |
| 3,690,799 | 9/1972 | Johnson | 425/168 |
| 3,697,210 | 10/1972 | Johnson | 425/168 |
| 3,733,162 | 5/1973 | Farkas | 425/534 X |
| 3,776,991 | 12/1973 | Marcus | 264/530 |
| 3,881,855 | 5/1975 | Farkas | 425/533 |
| 3,990,826 | 11/1976 | Marcus | 425/525 |
| 4,162,879 | 7/1979 | Makowski | 425/183 |
| 4,180,379 | 12/1979 | Rainville | 425/526 |
| 4,225,303 | 9/1980 | Crisci | 425/525 |
| 4,299,371 | 11/1981 | Duga | 425/525 X |
| 4,363,619 | 12/1982 | Farrell | 425/525 |
| 4,412,806 | 11/1983 | Gaiser et al. | 425/525 X |
| 4,550,862 | 11/1985 | Barker et al. | 222/109 |
| 4,640,855 | 2/1987 | St. Clair | 215/31 |
| 4,671,421 | 6/1987 | Reiber et al. | 215/228 |
| 4,696,416 | 9/1987 | Muckenfuhs et al. | 222/109 |
| 4,706,829 | 11/1987 | Li | 215/354 |

FOREIGN PATENT DOCUMENTS 461760 6/1952 Japan .
129658 10/1976 Japan .

Primary Examiner—Richard L. Chiesa
Attorney, Agent, or Firm—Gifford, Groh, Sprinkle, Patmore and Anderson

[57] ABSTRACT

An apparatus for forming a unitary molded container with a special neck configuration such as a drain-back neck with integrally molded internal threads and a pouring spout. The apparatus comprises a circumferentially continuous sleeve which surrounds the core rod in an injection-blow molding machine.

8 Claims, 3 Drawing Sheets

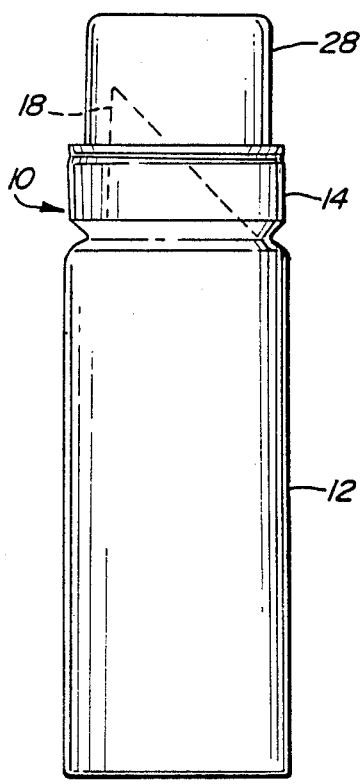
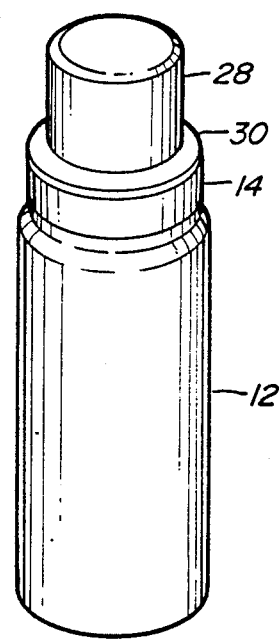
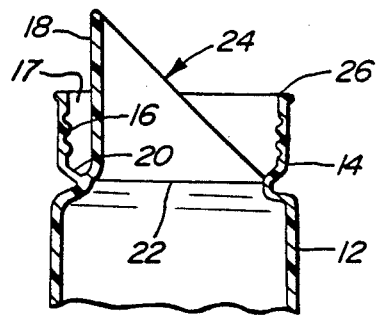
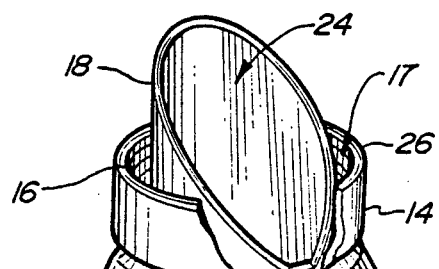
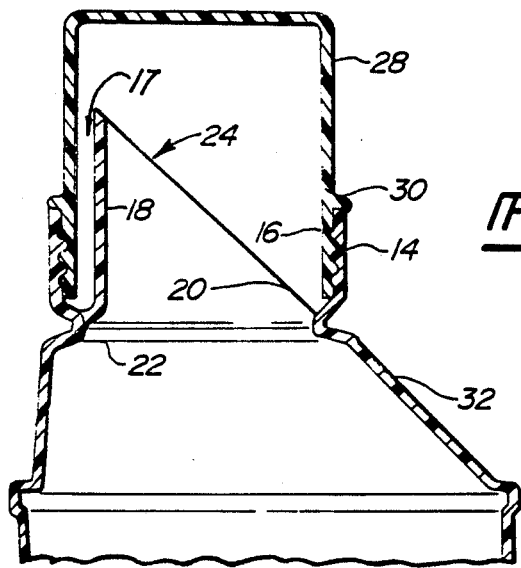
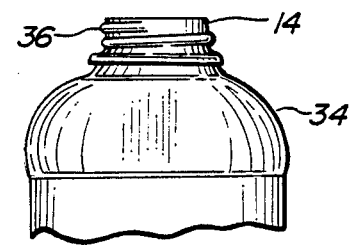

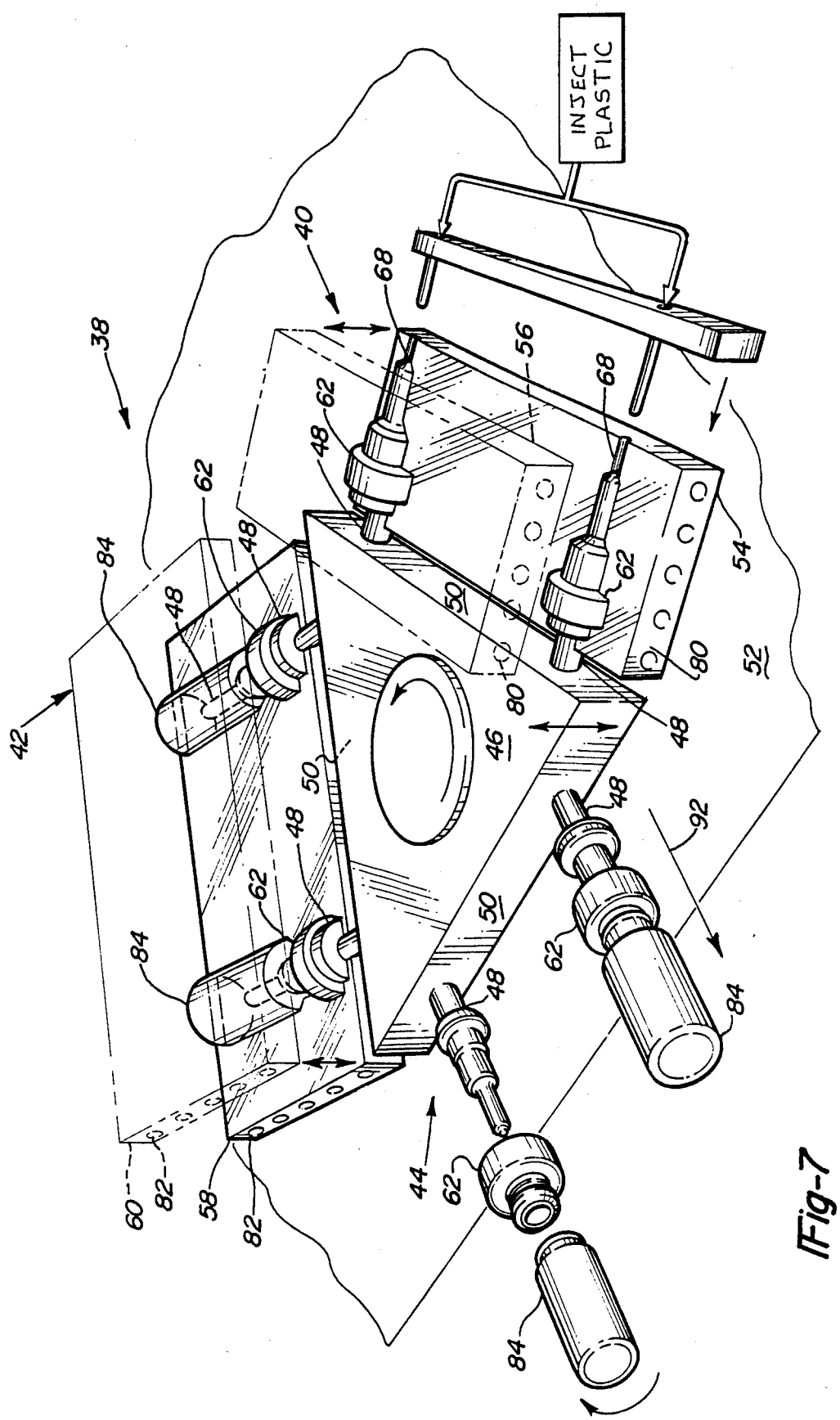

INJECTION-BLOW MOLDING APPARATUS

BACKGROUND OF THE INVENTION

1. Field of the Invention This invention relates to a method and apparatus for molding containers, and more particularly to a method and apparatus for molding plastic containers having a neck with closure attachment means by injection-blow molding. This invention also relates to a novel container formed by the new method and with the new apparatus for injection-blow molding.

2. Description of the Prior Art

Containers are commonly molded with an externally threaded neck for use with an internally threaded closure to cover and seal the container. With conventional injection-blow molding equipment and techniques the external threads have seams or parting lines which for certain applications may be undesireable. One aspect of the present invention provides a method and machinery for producing external neck threads without such parting lines.

In a dripless type of container/closure package, it is desirable to provide a neck finish with a pour spout to dispense the container product over the threads so they do not become gunked up and make a mess or cause a sealing problem. When the closure is to act as a measuring cup, it is also desireable to provide internal threads further reducing the possible mess and allowing the product remaining in the closure to drain back into the container when the closure is reapplied to the container neck. This has led to the development of various internally threaded inserts with and without pouring spouts which can be separately molded and affixed in some manner to the container neck. Another aspect of the present invention is the provision of a new method and apparatus for integrally molding the container neck finish with internal or external threads and a pour spout to provide a new unitary structure.

While threads are the conventional fastening means between the closure and container neck, the invention also contemplates a method and apparatus for forming other fastening or attachment means such as a snap flange on the container neck which will coact with a bead on the closure.

Regardless of the selection of internal or external threads or alternative fastening means, it is often desirable or necessary to provide a child resistant and/or a tamper indicating feature by an appendage molded on the container which coacts with the closure. The instant invention contemplates apparatus and a method for forming such child resistant and tamper indicating features by integrally molding such appendages concentrically around the neck finish which may or may not have a pour spout.

SUMMARY OF THE INVENTION

The present invention contemplates an improvement in the large variety of known methods and equipment for injection-blow molding containers with prescribed neck finishes. Such known equipment can have single or multiple injection and blowing molds with single or multiple cavities located at fixed or moving stations with core rods around which performs or parisons are molded in an injection mold. The parison is retained on the core rod as it is transferred from an injection to a blow mold and until the finished container is stripped or ejected. Such equipment has machinery for performing all the necessary attendant functions such as mechanisms for moving mold halves together and apart, transferring, cooling ejecting elements, controls and the like.

The new apparatus for use with any one of many available injection-blow molding machines for forming a container having a neck with closure attachment means includes at least one circumferentially continuous neck forming sleeve concentrically spaced around a core rod adjacent one end thereof. The sleeve has means for forming the container neck and the closure attachment means on the container neck when the core rod is in an operative position relative to an injection mold. The body of the parison from which the container body will be blown is formed between the injection mold and the core rod, and the container neck mouth is also formed by the core rod in the injection mold. Means is provided for maintaining the core rod and neck forming sleeve in a fixed axial relationship relative to each other during formation of the parison in the injection mold and during location of the core rod and parison in an operational position relative to a blow mold and formation of the container body, and, for subsequently moving the core rod and neck forming sleeve axially relative to each other for removal of the container from the injection-blow molding machine.

When the closure attachment means is an external or internal thread, the thread configuration is formed by the circumferentially continuous sleeve so as to provide a thread, free of any parting lines, and when a pour spout is also being formed, it is formed between the sleeve and core rod.

When an additional feature is to be added, such as a child resistant or tamper indicating element, additional concentric sleeves can be added to the apparatus. For example, a tamper indicating band and frangible webs can be formed between an additional concentric sleeve and the thread and spout forming sleeve.

The method of the instant invention forms a container with a neck having closure attachment means in an injection-blow molding machine by the following steps:

a core rod along with a circumferentially continous container neck forming sleeve which is spaced concentrically around the core rod adjacent one end of the core rod is positioned in operative relationship with an injection mold;

a parison is formed with a container neck at one end, the core rod forming the inside of the body of the parison and the mouth of the container neck and the circumferentially continuous sleeve forming the closure attachment means on the neck of the container;

the core rod and sleeve are maintained in a fixed axial relationship to each other with the formed container neck therebetween, and the core rod, sleeve and parison is positioned in operative relationship with a blow mold;

the parison is blown to form a container;

the core rod and forming sleeve are moved axially relative to each other; and the container is removed from the injection-blow molding machine.

When a container with a drain-back neck is being formed, a pouring spout can be formed between the core rod and the circumferentially continuous container neck forming sleeve.

The apparatus and method of this invention can be used to form a new unitary molded container having a drain-back neck which can be used in conjunction with an externally threaded measuring cup closure. This new container has a hollow body portion with a mouth opening into a cylindrical wall which forms the container neck. The neck terminates in an annular sealing lip and is internally threaded. An annular flange is located below the threads and is inwardly directed toward the mouth opening. A pouring spout concentric with the container neck extends from the periphery of the flange to a free end beyond the sealing lip. The spout, container neck, and the flange define a collection chamber which has an opening through the container mouth opening for flow of material accumulated in the chamber back into the container when the container is in an upright position.

The unitary molded container of the invention with the drain-back neck and integrally molded internal threads provides a container which can be more reliably sealed and uses less material to produce than similar prior art containers having separate inserts or containers which are formed by successive heating and forming steps after blow molding to provide a double wall neck structure.

DRAWINGS

The preferred embodiments of the invention are illustrated in the drawing in which:

FIGS. 1-5 are views of containers of this invention molded with the apparatus and by the process of this invention with the container necks having integrally molded internal threads and a pouring spout to provide drain-back containers to be used with externally threaded closures which serve as measuring cups typically for use with granular or liquid household products, more particularly:

FIG. 1 is a perspective view of a cylindrical drain-back container formed with the apparatus and by the process of this invention shown with a closure attached thereto;

FIG. 2 is an elevational view of the cylindrical container-closure package of FIG. 1 showing how the closure covers a pouring spout which has been integrally molded with the container neck;

FIG. 3 is a cross-sectional view of the container neck of FIGS. 1 and 2 showing the internal threads and concentric pouring spout molded integrally with the container neck;

Figure 8:
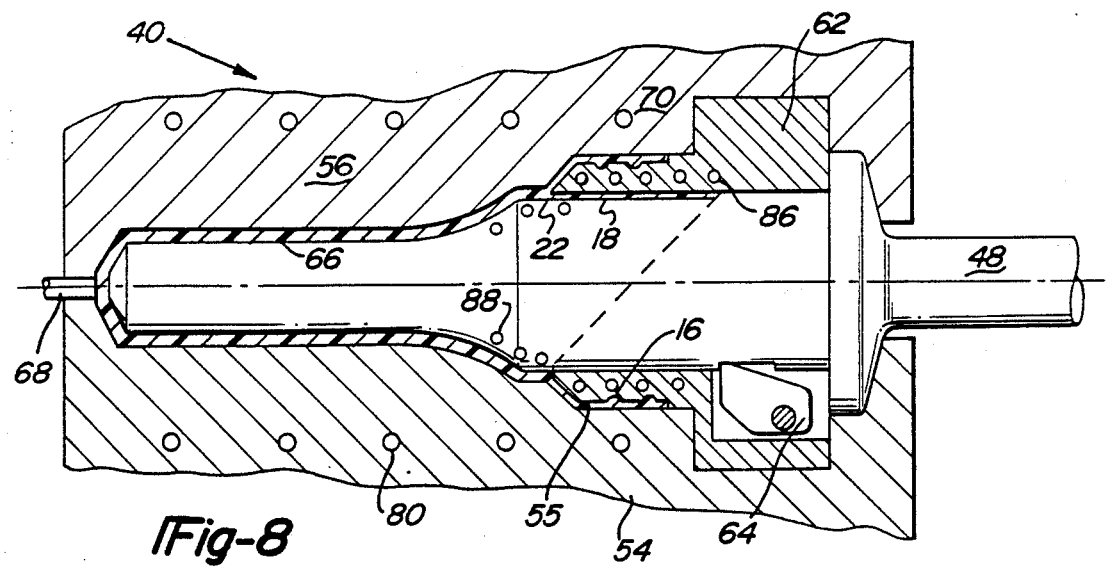
Figure 9:
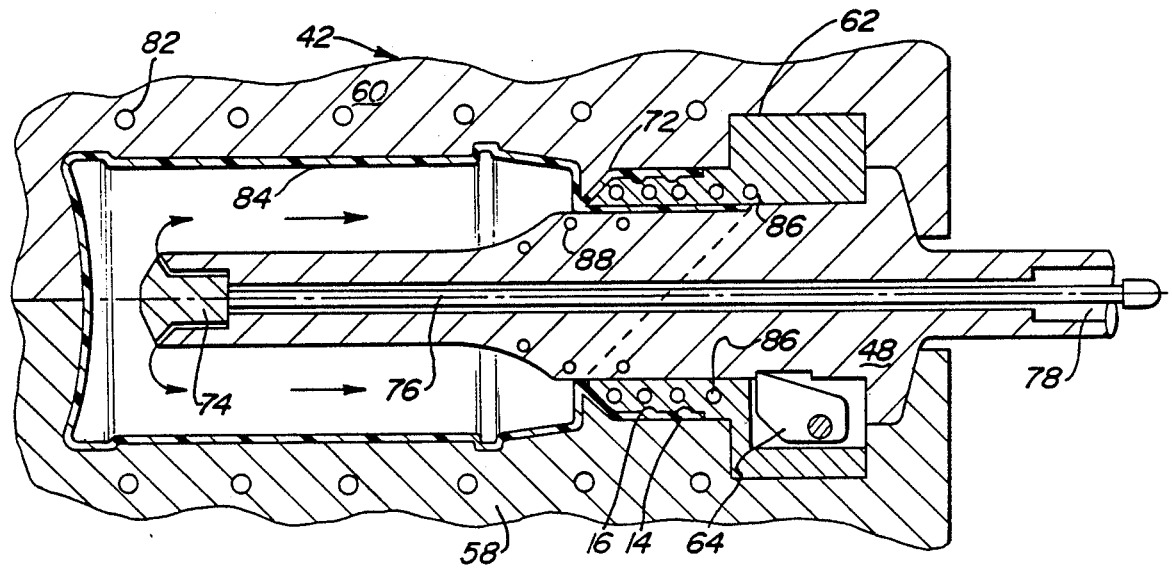
Figure 10:
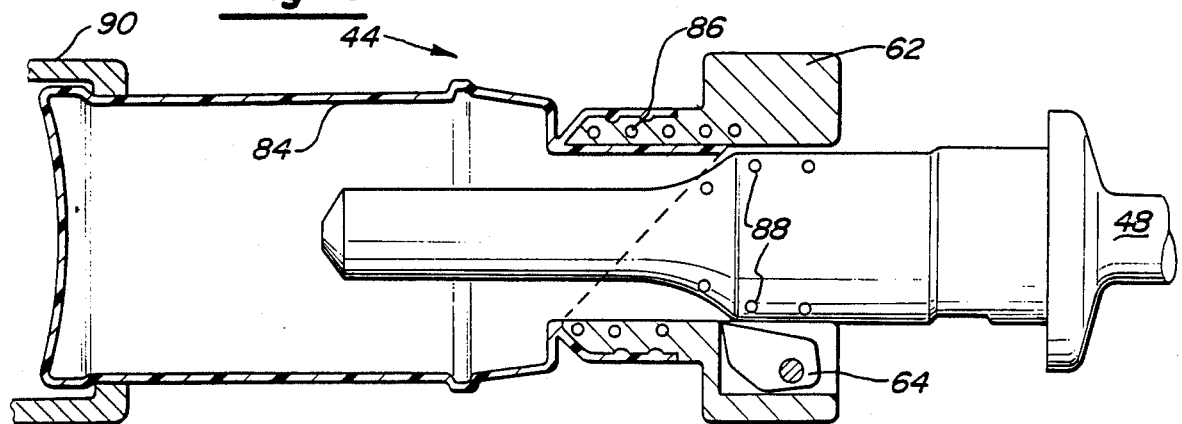

FIG. 4 is a partial perspective view of a non-cylindrical container of this invention formed with the apparatus and by the process of this invention with intergrally molded internal neck threads and a pouring spout to be used with a closure of the type shown in FIGS. 1, 2 and 5 which serves as a measuring cup to provide a drain-back, dripless container-closure package. A portion of the neck has been broken away to more clearly show a collection chamber defined by the spout, container neck and flange and to show the communication between the collection chamber and the container body through the mouth opening;

FIG. 5 is a cross-sectional view of the container neck of FIG. 4 showing the integrally molded internal threads and pouring spout molded into the container neck and additionally showing an externally threaded measuring cup closure in sealing engagement with the container neck;

FIG. 6 is a partial elevational view of a container having an externally threaded neck formed with the apparatus and by the process of this invention;

FIG. 7 is a perspective schematic view of a three-station injection-blow molding machine set up with the apparatus of this invention for performing the process of the invention to produce the container of the invention;

FIG. 8 is a cross-sectional view of the apparatus of this invention showing the core rod and the circumferentially continous container neck forming sleeve spaced concentrically around the core rod as they are located in an injection mold which can be the mold at the first work station of the apparatus of FIG. 7 and showing the formation of a parison with an internally threaded neck by injection molding;

FIG. 9 is a cross-sectional view similar to FIG. 8 showing the core rod and neck forming sleeve of this invention in this position within a blow mold which can be the mold at the second work station of the apparatus of FIG. 7 and showing the completed container after the blowing step;

FIG. 10 is a cross-sectional view similar to FIGS. 8 and 9 showing the core rod and neck forming sleeve with the completed container at the stripping or ejection station which can be the third station of the apparatus of FIG. 7 showing the core rod moved out of contact with the container neck prior to the container being been unthreaded or ejected from the neck forming sleeve and core rod.

DETAILED DESCRIPTION OF PRESENTLY PREFERRED EMBODIMENT

There are a number of different machine configurations available from several manufacturers for injection-blow molding containers or bottles with various neck configurations. One type of machine utilizes a central turret which advances core rods mounted on the turret faces in a generally horizontal plane between work stations. Machinery of this type is shown in U.S. Pat. No. 3,697,210 issued to Johnson and U.S. Pat. No. 4,162,879 issued to Makowski.

The core rod carrying turret machine typically has three work stations arranged around a central triangular shaped turret. The three stations are an injection station, a blowing station and a stripper station. The triangular shaped turret has a plurality of identical core rods or parison pins which project outwardly from each of three turret faces. The number of core rods used or parts being produced depends upon the size and shape of the product being formed. The turret indexes the core rods between stations and is synchronized with associated mechanisms for opening and closing multiple cavity die halves at the injection and blow molding stations. At the injection station the core rods are introduced between the open halves of a parison die. The die halves are closed and a parison is formed around each core rod with the inside of the container neck being formed by the core rod and the external surface of the container neck being formed by the mated die halves. The die halves are opened at the injection and blowing stations and the core rods with the parisons are moved from the injection station to the blowing station. The die halves of the multiple cavity blow mold are then closed, and air is introduced into the parisons to produce the finished containers. The mold parts are again opened and the core rods with the finished containers are moved from the blowing station to the stripper station where the finished parts are ejected off the core rods. Generally, the turret not only transfers the core rods between the successive stations, but is also arranged to be elevated in synchronization with the opening and closing of the mold halves to lift the core rods out of the lower mold halves. The mold halves are normally liquid cooled, and the core rods have suitably valving for introducing pressurized air for expansion of the parisons at the blowing station and for subsequent cooling of the core rods. There are many variations of this basic concept. For example, U.S. Pat. No. 3,690,799 shows a hexagon shaped turret with the six surfaces providing opposed injection stations, opposed molding stations, and opposed stripper stations. It is also possible to operate with as little as two stations or at least with a two faced turret so that ejection or stripping takes place between the injection and blowing stations.

Bottles molded with the above described injection blow molding machines normally carry conventional external threads on their necks. These threads are formed by the injection molding dies at the injection station and are held in position by dies with a somewhat larger thread configuration at the blowing station. This tends to change the shape of the threads and causes irregularities and differences between molded bottles. Also the flash attendant with a two piece die which occurs at the parting lines produces thread irregularities.

While the apparatus and method of this invention will be described as applied to an injection-blow molding machine of the horizontally disposed core rod turret design schematically shown in FIG. 7, it will be apparent that the injection molding station of FIG. 8, the blow molding station of FIG. 9 and the ejection station of FIG. 10 can be part of an injection-blow molding machine of many other configurations.

Another type of injection-blow molding machine to which the present apparatus can be applied is known as a shuttle mold machine. One of these machines is shown in U.S. Pat. No. 3,183,552 (RE26,265) to Farkas. In this machine the injection molds or multiple cavities have a parallel orientation and are located in a central horizontal plane. The blow molds or cavities are located in horizontal planes above and below the injection molds. The core rods are shuttled between the injection molds in which the parisons are formed and the upper or lower blow molds for formation of the containers. The container necks are formed in a split collar mold which remains clamped together at the injection mold station and remains clamped to carry the parison on the core rod into the blow molds.

In the injection-blow molding machine shown in U.S. Pat. No. 3,881,855 to Farkas the core rods and multiple cavity blow mold halves are located on a vertical turret. A multiple cavity injection mold is introduced between a pair of open blow molds by a cross carriage or walking beam during a portion of the continuous turret rotation. In the machine shown in U.S. Pat. No. 3,733,762 to Farkas a vertically or horizontally positioned turret has two core rods (or two rows of core rods) located at 90 degrees to each other, and the turret is caused to reciprocate between two in line blow molds and an injection mold located between and 90 degrees from the two in line blow molds.

In all machines, the mold components which form the container neck are made in halves which open up to allow the finished bottle to be ejected from the core rod.

Referring first to the unitary container of this invention which has a drain-back neck, a container-closure package is shown in FIGS. 1–3 with a hollow cyndrically shaped container 12 having a mouth opening into a cylindrical wall which forms the container neck 14. The neck terminates with an annular sealing lip 26, and the neck is formed with a continuous internal thread 16 having no parting line. An annular flange 20 is located below internal threads 16 and is inwardly directed toward the mouth opening 22 into the container. A pouring spout 18 concentric with container neck 14 extends upward from the periphery of flange 20 to a free end beyond the sealing lip 26. The spout 18, container neck 14, and the flange 20 define a collection chamber 17. The spout 18 has an opening 24 which is shown as extending from the outermost end of the spout 18 to the flange 20. This allows the flow of material accumulated in chamber 17 to flow back into the container through mouth opening 22 when the container is in an upright position. Pouring spout 18 allows the product to be poured over the neck 14 and sealing lip 26 to avoid a sticky mess on the outside of the container neck and the lip which typically occurs with such products as honey, syrup, paint oil, cough medicine, glue and the like. The closure 28 has external threads which cooperate with the internal container neck threads 16. The closure 28 can be used as a measuring cup, and the product remaining in the closure will return through the collection chamber to the container body. Flange 30 of the closure 28 seals against container lip 26.

The drain-back container 32 of FIGS. 4 and 5 is non-circular in form and can be provided with a molded handle, not shown. Aside from its non-circular form, the container is formed in the same manner as the container of FIGS. 1–3 with neck 14 provided with internal threads 16, and an inwardly directed flange 20 forming with pouring spout 18 a collection chamber 17 in communication with the mouth opening 22 into the body of the body of the container.

The cylindrical container 34 of FIG. 6 is shown with its neck 14 formed with external threads 36 by the method of this invention which produces a continuous thread without parting lines.

Referring now to FIG. 7, the apparatus and method of this invention is set forth in the environment of an injection-blow molding machine of the horizontal core rod turret design so that it will be apparent how the apparatus and method of the invention can be applied to any injection-blow molding machine.

The injection-blow molding machine 38 depicted schematically in FIG. 7 includes an injection station 40, a blowing station 42, and a stripping station 44. These stations are equally spaced around a triangular indexing turret 46. Identical core rods 48 extend outwardly from the three faces 50 of the turret 46. There is one core rod for each container to be formed, the number of containers in turn being governed by the size and shape of the individual containers. For clarity, only two rods 48 are shown on each face 50 of the turret 46.

As more fully set forth in the previously mentioned U.S. Pat. Nos. 3,697,210 and 4,162,879, the injection molding station 40 and the blow molding station 42 are provided with horizontally split mold halves, 54, 56 and 58, 60 respectively. The position of the upper mold halves 56 and 60 are shown in a fragmentary form to indicate an elevated position of these mold halves which allows the turret 46 to be elevated and rotated by indexing means, not shown so that the core rods or parison pins 48 can be successively indexed between the three stations, 40, 42 and 44.

The core rods 48 are shown in association with the key element of the apparatus of this invention in partial horizontal sectional views of the injection station 40, the blowing station 42, and the stripping or ejection station 44 in FIGS. 8-10 respectively.

Referring to FIG. 8, the core rod 48 is shown in place in respect to lower and upper mold halves when they are in the closed position for injection molding parison 66. The new apparatus of this invention is the circumferentially continuous container neck forming sleeve 62 which is spaced concentrically around the core rod 48 adjacent to one end of the rod and is fixed axially relative to the core rod by cam lock mechanism 64. Parison 66 is formed by the injection of material into the inlet end 68 of the mold. Conventionally this can be a molten thermoplastic material. The container neck 14 is formed at one end of the parison by the neck forming portion 55 of the mating mold halves 54 and 56 on the outside and the circumferentially continuous neck forming sleeve 62 on the inside forming internal threads 16. The pouring spout is formed between the neck ring 62 and the core rod 48. The mouth opening 22 of the container is formed by the core rod 48.

The injection mold halves 54 and 56 can be liquid or gas cooled or heated through internal passages 80 as shown in FIGS. 7 and 8. The fluid passages allow maintainance of the proper mold temperature to provide conditioning of the parison to an optimum blow molding temperature. Additionally, alternatively, or optionally, temperatures of the core rod 48 and neck forming ring 62 can be controlled by fluids introduced through passages 86 and 88, as shown in FIGS. 8 and 9.

Injection mold halves 54 and 56 and blow mold halves 58 and 60 are opened by the upward movement of upper mold halves 56 and 60 after formation and temperature conditioning of the parisons to transport the parisons along with the core rods and forming sleeves, with the molded neck portion contained between the two, from the injection mold halves 54, 56 to the blow molds 58, 60 at blow molding station 42. While the container neck is being held between the blow mold halves 58 and 60 by cooperation between the neck forming sleeve 62 and core rod 48, the finished container 84 is blown by air introduced into the parison 66 in a conventional manner. Typically this air is introduced through core rod 48 by actuation of valve 74 by rod 76 to introdue pressurized air from port 78. The temperature of the container mold 58, 60 is maintained relative to the setting point of the plastic by fluids introduced through passages 82 as schematically shown in FIGS. 7 and 9.

The mold halves 54, 58 and 60 are again opened and the turret 46 is elevated and indexed to transport the finished containers 84 with their necks still confined between the neck forming sleeves 62 and core rods 48 to stripping station 44. The core rods 48 are moved out of contact with the container necks by movement of the core rods 48 or container sleeves 62 to produce relative movement therebetween and between the core rods 48 and the formed container 84. The cam lock 64 is released to allow this relative movement. Specific linkage between the forming sleeves 62 and core rods 48 and the turret 46 has not been shown for clarity.

As a final step, the container is ejected from the neck forming sleeve 62 at the stripping station 44. This can be accomplished by unthreading the neck from the forming sleeve 62 by the use of robot turning fingers 90 as shown in FIG. 10, or by other conventional means. For example, in some instances, the container neck 84 may be stripped from the thread 62 by the use of a stripper plate not shown. The ejection station 44 in FIG. 7 shows one of the containers in exploded view completely separated from the neck forming sleeve and core rod, and the other container is shown with the sleeve 62 having been moved relative to the core rod 48 preparatory to the stripping movement in the direction of arrow 92.

Each time the turret 46 is indexed and the injection and blow mold halves are closed, new parisons will be formed with the desired container neck configuration by the core rods and the circumferentially continuous neck forming sleeves at the injection station 40; containers will be blow molded at station 42 while the neck is held between the core rod and neck forming sleeve, and the neck forming sleeve and core rod will be moved relative to each other at the stripping station 44 and the finished container will be ejected.

If the container is to be formed with a neck finish including more than the closure attachment means and pouring spout, an additional circumferentially continuous sleeve or sleeves will be concentrically located around the neck forming sleeve. For example, a tamper indicating flange or child resistant stop can be formed between such an additional sleeve and the neck forming sleeve.

The embodiments of the invention in which an exclusive property or privilege is claimed are defined as follows:

1. Apparatus in combination with an injection-blow molding machine for forming a container having a neck with closure attachment means and a radially
   an injection mold having a neck forming portion for forming a parison with a container neck; offset structure, said machine including:
   a blow mold;
   a core rod; and
   positioning means for sequentially locating said core rod in an operative position relative to said injection mold to mold a parison and in an operative position relative to said blow mold for forming said container;
   said apparatus comprising:
   at least one circumferentially continuous neck forming sleeve concentrially spaced around said core rod said sleeve having means for forming said container neck with said closure attachment means and said radially offset structure when said core rod is in said operative position relative to said neck forming portion of said injection mold; and
   securing means for maintaining said core rod and neck forming sleeve in fixed axial relationship relative to each other during formation of said parison with said container neck in said injection mold and during location of said neck forming sleeve, said core rod and parison in an operational position relative to said blow mold, said securing means being operable to allow movement of said core rod and neck forming sleeve axially relative to each other for removal of said container from said machine.

2. Apparatus according to claim 1 wherein said securing means is operable to allow movement of said core rod free from said container neck for removal of said container from said neck forming sleeve.

3. Apparatus according to claim 1 wherein said circumferentially continuous neck forming sleeve and said core rod are configured to mold said radially offset structure to define a pouring spout between them when located in operative position relative to said neck forming portion of said injection mold.

4. Apparatus according to claim 3 wherein said circumferentially continuous neck forming sleeve has an internal surface configured to form external threads as said closure attachment means on said container neck.

5. An injection-blow molding machine for forming a container having a neck with closure attachment means and a radially offset structure comprising, in combination:
   an injection mold having a neck forming portion for forming a parison with a container neck;
   a blow mold;
   a core rod and at least one circumferentially continuous neck forming sleeve concentrically spaced around said core rod, said sleeve having means for forming said container neck with said closure attachment means and said radially offset structure;
   positioning means for locating said core rod and neck forming sleeve in an operative position relative to said neck forming portion of said injection mold to mold a parison having a body portion formed between said core rod and said injection mold and a neck having closure attachment means and a radially offset structure formed by said sleeve in cooperation with the neck forming portion of said injection mold and said core rod;
   said positioning means maintaining said core rod and neck forming sleeve in fixed axial relationship relative to each other and said parison while moving them from said injection mold to said blow mold for forming said container;
   and means associated with said positioning means for moving said core rod and neck forming sleeve axially relative to each other for removal of said container from said machine.

6. The injection-blow molding machine of claim 5 wherein the interior configuration of said sleeve forms the exterior surface of said radially offset structure defining a pouring spout.

7. The injection-blow molding machine of claim 6 wherein the exteior configuration of said sleeve forms said closure attachment means defining internal threads on the neck circumposing said pouring spout and said neck forming portion of said injection mold forms an exterior surface of said neck.

8. An injection blow molding machine for forming a container having a neck with closure attachment means and a structure radially offset from said neck, comprising, in combination:
   an injection mold having a neck forming portion for forming a parison with a container neck,
   a blow mold,
   an elongated core rod moveable between said injection mold and blow mold,
   said elongated core rod having an exterior configuration corresponding to the interior configuration of said parison, a circumferentially continuous sleeve mounted coaxially on said core rod and being moveable between first and second positions relative thereto, said sleeve:
   (a) having an exterior configuration defining said closure attachment means and an interior configuration determining the radially outer shape of said offset structure,
   (b) being in said first position when said core rod is in said injection mold, the neck forming portion of said injection mold determining the exterior configuration of said neck on said parison,
   (c) being in said first positin when said core rod and said parison is in said blow mold, said blow mold determining the exterior configuration of said container,
   (d) being moveable to said second position relative to said core rod upon removal from said blow mold to permit removal of said container from said core rod and said sleeve.

* * * * *